United States Patent
Jang et al.

(10) Patent No.: US 11,843,969 B2
(45) Date of Patent: *Dec. 12, 2023

(54) METHOD AND DEVICE FOR PROCESSING BUFFER STATE REPORT IN WIRELESS COMMUNICATION SYSTEM USING INTER-ENB CARRIER AGGREGATION TECHNOLOGY

(71) Applicant: Samsung Electronics Co., Ltd., Suwon-si (KR)

(72) Inventors: Jae Hyuk Jang, Suwon-si (KR); Soeng Hun Kim, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

This patent is subject to a terminal disclaimer.

(21) Appl. No.: 17/693,889

(22) Filed: Mar. 14, 2022

(65) Prior Publication Data
US 2022/0201544 A1   Jun. 23, 2022

Related U.S. Application Data

(63) Continuation of application No. 16/839,725, filed on Apr. 3, 2020, now Pat. No. 11,277,767, which is a (Continued)

(30) Foreign Application Priority Data

May 14, 2012   (KR) .................. 10-2012-0051107

(51) Int. Cl.
*H04W 28/02* (2009.01)
*H04L 5/00* (2006.01)
(Continued)

(52) U.S. Cl.
CPC ......... *H04W 28/0278* (2013.01); *H04L 5/001* (2013.01); *H04L 5/0053* (2013.01); *H04W 72/21* (2023.01); *H04W 72/23* (2023.01)

(58) Field of Classification Search
CPC .. H04L 5/001; H04L 5/0053; H04W 28/0278; H04W 72/0413; H04W 72/042
See application file for complete search history.

(56) References Cited

U.S. PATENT DOCUMENTS 8,165,066 B2   4/2012   Tseng
8,488,515 B2   7/2013   Lee et al.
(Continued)

FOREIGN PATENT DOCUMENTS

EP   2 343 945 A2   7/2011
EP   2 429 249 A1   3/2012
(Continued)

OTHER PUBLICATIONS

"Mapping of RRC Signaling onto Logical Channels" 3GPP TSG GERAN WG2#5bis Jun. 25-29, 2001 Helsinki, Finland Source: Ericsson Tdoc G2-010064 Agenda item 7.2.5.5 (Year: 2001).*
(Continued)

*Primary Examiner* — Gary Mui
(74) *Attorney, Agent, or Firm* — Jefferson IP Law, LLP

(57) ABSTRACT

The present invention proposes a method of processing a buffer state report when a wireless communication system uses inter-eNB carrier aggregation technology. According to the present invention, a terminal may be provided with a proper amount of uplink resource allocations by notifying base stations of a buffer state.

12 Claims, 13 Drawing Sheets

Related U.S. Application Data continuation of application No. 16/052,934, filed on Aug. 2, 2018, now Pat. No. 10,616,793, which is a continuation of application No. 14/399,322, filed as application No. PCT/KR2013/004239 on May 14, 2013, now Pat. No. 10,045,248.

(51) Int. Cl.
*H04W 72/21* (2023.01)
*H04W 72/23* (2023.01)

(56) References Cited

U.S. PATENT DOCUMENTS

| | | |
|---|---|---|
| 2009/0175229 A1 | 7/2009 | Tseng |
| 2010/0008236 A1 | 1/2010 | Zhang et al. |
| 2010/0098011 A1 | 4/2010 | Pelletier et al. |
| 2010/0232387 A1 | 9/2010 | Marchand et al. |
| 2011/0170495 A1 | 7/2011 | Earnshaw et al. |
| 2011/0274044 A1 | 11/2011 | Park et al. |
| 2011/0275359 A1 | 11/2011 | Sebire et al. |
| 2011/0310800 A1 | 12/2011 | Lin et al. |
| 2011/0310937 A1 | 12/2011 | Lin et al. |
| 2012/0099452 A1 | 4/2012 | Dai et al. |
| 2012/0113922 A1 | 5/2012 | Kim et al. |
| 2012/0195281 A1 | 8/2012 | Kim |
| 2013/0010738 A1 | 1/2013 | Marchand et al. |
| 2013/0083677 A1 | 4/2013 | Kim et al. |
| 2013/0172001 A1 | 7/2013 | Gerlach et al. |
| 2013/0176988 A1 | 7/2013 | Wang et al. |
| 2014/0307663 A1 | 10/2014 | Huang et al. |
| 2018/0375776 A1* | 12/2018 | Hsu .............. H04W 72/1284 |

FOREIGN PATENT DOCUMENTS

| | | |
|---|---|---|
| EP | 2 775 773 A1 | 9/2014 |
| JP | 2009-165128 A | 7/2009 |
| KR | 10-2010-0094534 A | 8/2010 |
| KR | 10-2010-0095617 A | 8/2010 |
| KR | 10-2012-0025615 A | 3/2012 |
| WO | 2011/043637 A2 | 4/2011 |
| WO | 2011/100492 A1 | 8/2011 |

OTHER PUBLICATIONS

"Mapping between logical channel priority and LCG and SL BSR" 3GPP TSG-RAN WG2 Meeting #91bis R2-154816 Malmö, Sweden, Oct. 5-9, 2015 Agenda item: 7.5.4 Source: Nokia Networks (Year: 2015).*

3GPP, 3rd Generation Partnership Project; Technical Specification Group Radio Access Network; Evolved Universal Terrestrial Radio Access (E-UTRA); Medium Access Control (MAC) protocol specification (Release 10), Mar. 2012, pp. 1-54, 3GPP TS 36.321, V10.5.0, 3GPP, Sophia Antipolis, Valbonne, France.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 13, 2012, http://www.3gpp.org/ftp/Specs/archive/36_series/36.331/.

* cited by examiner

METHOD AND DEVICE FOR PROCESSING BUFFER STATE REPORT IN WIRELESS COMMUNICATION SYSTEM USING INTER-ENB CARRIER AGGREGATION TECHNOLOGY

CROSS-REFERENCE TO RELATED APPLICATION(S)

This application is a continuation application of prior application Ser. No. 16/839,725, filed on Apr. 3, 2020, which is a continuation application of prior application Ser. No. 16/052,934, filed on Aug. 2, 2018, which has issued as U.S. Pat. No. 10,616,793 on Apr. 7, 2020, which is a continuation application of prior application Ser. No. 14/399,322, filed on Nov. 6, 2014, which has issued as U.S. Pat. No. 10,045,248 on Aug. 7, 2018, which is a U.S. National Stage application under 35 U.S.C. § 371 of an International application number PCT/KR2013/004239, filed on May 14, 2013, which is based on and claims priority of a Korean patent application number 10-2012-0051107, filed on May 14, 2012, in the Korean Intellectual Property Office, the disclosure of each of which is incorporated by reference herein in its entirety.

TECHNICAL FIELD

The present invention relates to wireless communication systems, and more particularly, to a method for processing buffer status report (BSR) when carriers of a number of ENBs are simultaneously used in a long term evolution (LTE) system.

BACKGROUND ART

With the rapid development of wireless communication technology, communication systems are also evolving, employing it. One of the examples is a long term evolution (LTE) system, which has been developed as the $4^{th}$ generation LTE system. LTE systems employ a variety of technologies to meet the rapid increase in traffic demand, one of which is carrier aggregation. Carrier aggregation refers to a technology that increases the number of carriers in communication between user equipment (UE) and an evolved Node B (ENB) to employ from one carrier in conventional art to a primary carrier and one or more secondary carriers, thereby increasing the amount of transmission by the number of secondary carriers. In LTE technology, a cell where a primary carrier is served is called a Primary Cell (PCell) and a cell where a secondary carrier is served is called a Secondary Cell (SCell).

In order to comply with the rapid increase in traffic, service providers have installed Pico ENBs with narrow service coverage as well as Macro ENBs with wide service coverage. This causes overlaps between the service coverages of Pico ENB and Macro ENB. In order to increase data transmission rate of UE in a state where the service coverage overlap occurs, a technology has been discussed where UE are simultaneously connected to a macro ENB and a pico ENB and also uses the carriers of the Macro ENB and carriers of the Pico ENB.

In the scenario described above, a macro ENB has three carriers (since a primary ENB doesn't have to be a macro ENB, it is hereinafter called a serving ENB). UE uses one of the three carriers as a PCell and the two carriers as SCell 2 and SCell 2 respectively. In addition, a pico ENB has two carriers (since the other ENBs except for the primary ENB don't have to be pico ENBs, they are hereinafter called drift ENBs). UE uses one of the three carriers as a PCell and the two carriers as SCell 2 and SCell 2 respectively. UE uses the two carriers as SCell 3 and SCell 4. Carriers (PCell, SCell 1 and SCell 2) of the serving ENB are called a Primary Set. Carriers (SCell 3 and SCell 4) of the drift ENB are called a Non-primary Set.

UE transmits a Buffer Status Report (BSR) on the uplink via a cell in order to report an amount of data to be transmitted. Since the UE is connected with a number of ENBs, there arises the problem of how many resources each ENB must allocate to the UE.

DISCLOSURE OF INVENTION

Technical Problem

The present invention has been made in view of the above problems, and provides a method for transmitting a Buffer Status Report (BSR) from UE to ENB, using an inter-ENB carrier aggregation technology, in a wireless mobile communication system, and a method and apparatus for processing BSR in ENB.

Solution to Problem

In accordance with an exemplary embodiment of the present invention, the present invention provides a method for processing a buffer status report (BSR) in user equipment (UE) of a wireless communication system, including: receiving a command for associating with cells and information regarding logical channel groups (LCGs) from a serving ENB; detecting, when a BSR is triggered, an LCG to which the BSR corresponds using the received information regarding LCGs; and creating a BSR of the corresponding LCG and transmitting it to an ENB that can perform transmission.

In accordance with another exemplary embodiment of the present invention, the present invention provides a method for receiving a buffer status report (BSR) in an ENB of a wireless communication system, including: determining, when receiving the BSR from UE, whether the UE is connected to other ENBs for carrier aggregation; transmitting, when the UE is connected to other ENBs for carrier aggregation, the received BSR to other BSRs; and allocating resources to the UE according to the BSR.

In accordance with another exemplary embodiment of the present invention, the present invention provides a system for processing a buffer status report (BSR) in user equipment (UE) of a wireless communication system, including: a transceiver for transmitting and receiving data; and a controller. The controller: receives a command for associating with cells and information regarding logical channel groups (LCGs) from a serving ENB; detects, when a BSR is triggered, an LCG to which the BSR corresponds using the received information regarding LCGs; and creates a BSR of the corresponding LCG and transmitting it to an ENB that can perform transmission.

In accordance with another exemplary embodiment of the present invention, the present invention provides a system for receiving a buffer status report (BSR) in an ENB of a wireless communication system, including: a transceiver for transmitting and receiving data; and a controller. The controller: determines, when receiving the BSR from UE, whether the UE is connected to other ENBs for carrier aggregation; transmits, when the UE is connected to other ENBs for carrier aggregation, the received BSR to other BSRs; and allocates resources to the UE according to the BSR.

Advantageous Effects of Invention

The features and advantages of the invention will become more apparent from the following detailed description in conjunction with the accompanying drawings, in which:

MODE FOR THE INVENTION

Hereinafter, exemplary embodiments of the present invention are described in detail with reference to the accompanying drawings. Detailed descriptions of well-known functions and structures incorporated herein may be omitted to avoid obscuring the subject matter of the invention.

In the following description, embodiments of the present invention are described with reference to the accompanying drawings explaining mobile devices.

Figure 1:
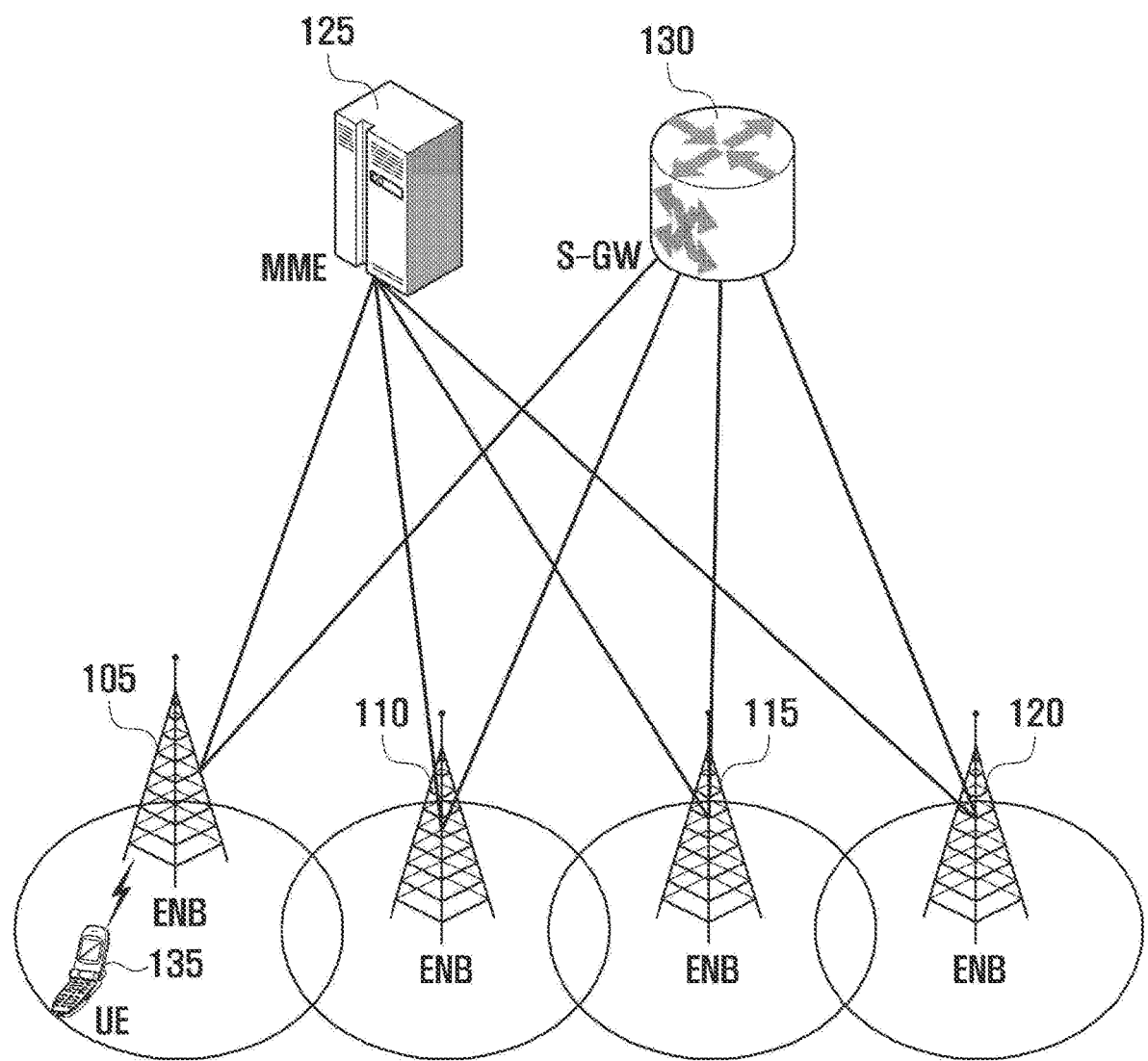
FIG. 1 illustrates a view that describes the configuration of an LTE system according to an embodiment of the invention.

FIG. 1 illustrates a view that describes the configuration of an LTE system according to an embodiment of the invention.

Referring to FIG. 1, the LTE system configures the wireless access network, including Evolved Node Bs (ENBs) 105, 110, 115, and 120, a mobility management entity (MME) 125, and a serving-gateway (S-GW) 130. User equipment (UE) 135 is connected to an external network via the ENB 105, 110, 115, or 120 and the S-GW 130.

ENBs 105 to 120 correspond to conventional Node B of the UMTS system. ENBs 105 to 120 are connected to UE 135 via wireless channels, performing more complicated functions than conventional Node B. Since real-time Voice over IP (VoIP) services and all user traffic are served via shared channels in LTE system, devices are required to collect information regarding states, such as buffer states of UE, available transmission power states, channel states, etc., and to make schedules. This job can be performed via ENBs 105 to 120.

One ENB controls a number of cells. For example, in order to implement a transmission rate of 100 Mbps, an LTE system employs orthogonal frequency division multiplexing (OFDM) at a bandwidth of 20 MHz. The LTE system also employs adaptive modulation & coding (AMC) to determine modulation scheme and channel coding rate, meeting with the channel state of UE. S-GW 130 is a device that establishes data bearers. S-GW 130 can create or remove data bearers according to the control of MME 125. MME 125 manages the mobility of UE and controls a variety of functions. MME 125 connects to a number of ENBs.

Figure 2:
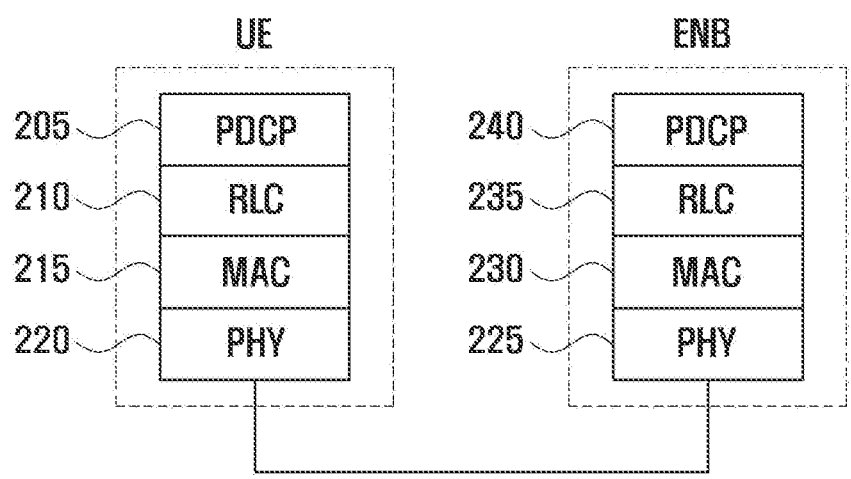
FIG. 2 illustrates a view that describes the wireless protocol stack of an LTE system according to an embodiment of the invention.

FIG. 2 illustrates a view that describes the wireless protocol stack of an LTE system according to an embodiment of the invention.

Referring to FIG. 2, UE and ENB have packet data convergence protocols (PDCP) 205 and 240, radio link control (RLC) 210 and 235, and medium access controls (MAC) 215 and 230, respectively. PDCP 205 and 240 compress/decompress the IP header. RLC 210 and 235 reconfigure PDCP packet data unit (PDU) in proper size. MAC 215 and 230 connect to a number of RLC layer devices configured in one UE device. MAC 215 and 230 multiplex RLC PUDs to MAC PDU, and de-multiplex RLC PDUs from MAC PDU. Physical layers (PHY) 220 and 225 in UE and ENB channel-code and modulate data from the upper layers, create OFDM symbols, and transmit them via a wireless channel. In addition, PHY 220 and 225 demodulate and channel-decode OFDM symbols received via a wireless channel, and transfer them to the upper layers.

PHY 220 and 225 also employ Hybrid ARQ to perform addition error correction, where the receiving end determines whether a packet from a transmitting end has been received by transmitting 1 bit to the transmitting end, which is called HARQ ACK/NACK information. Downlink HARQ ACK/NACK information with respect to uplink transmission is transmitted via physical hybrid-ARQ indicator channel (PHICH). Likewise, uplink HARQ ACK/NACK information with respect to downlink transmission is transmitted via physical uplink control channel (PUCCH) or physical uplink shared channel (PUSCH).

Figure 3:
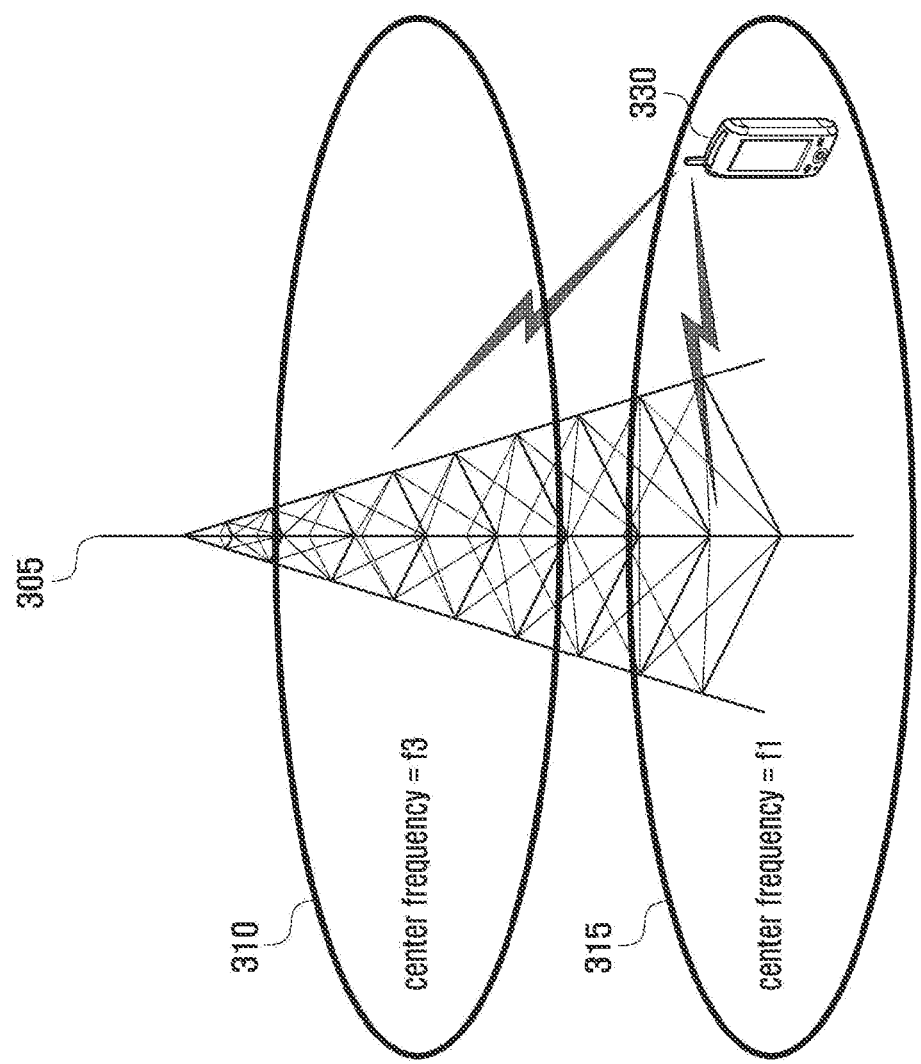
FIG. 3 illustrates a view that describes carrier aggregation in user equipment UE.

FIG. 3 illustrates a view that describes carrier aggregation in user equipment UE.

Referring to FIG. 3, one ENB broadcasts/receives multi-carriers over frequency bands. For example, when an ENB 305 broadcasts a carrier 315 of center frequency f1 and a carrier 310 of center frequency f3, one conventional UE device transmits/receives data via one of the carriers 315 and 310. However, according to the invention, UE that performs carrier aggregation can simultaneously transmit/receive data using a number of carriers. In that case, ENB 305 can allocate more carriers to UE 330 that can perform carrier aggregation, so that the UE 330 can increase the data transmission rate.

If it is assumed that a cell is formed by one forward carrier and one reverse carrier that are each transmitted/received from/by one ENB, carrier aggregation may be understood as UE simultaneously transmits/receives data via a number of cells. In that case, the maximum transmission rate may increase in proportion to the number of aggregated carriers.

In the following description, receiving data by UE via a forward carrier or transmitting data by UE via a reverse carrier means that data is received/transmitted via a control channel and a data channel provided by a cell corresponding to a frequency band and a center frequency characterizing the carrier. For the sake of convenience, the following embodiment will be described based on LTE systems. However, it should be understood that the invention is not limited to the embodiment. For example, the invention can be applied to all types of wireless communication systems that can support carrier aggregation.

In the following description, it is assumed that UE uses carriers by aggregating cells covering a number of ENBs, which is inter-ENB carrier aggregation.

Figure 4:
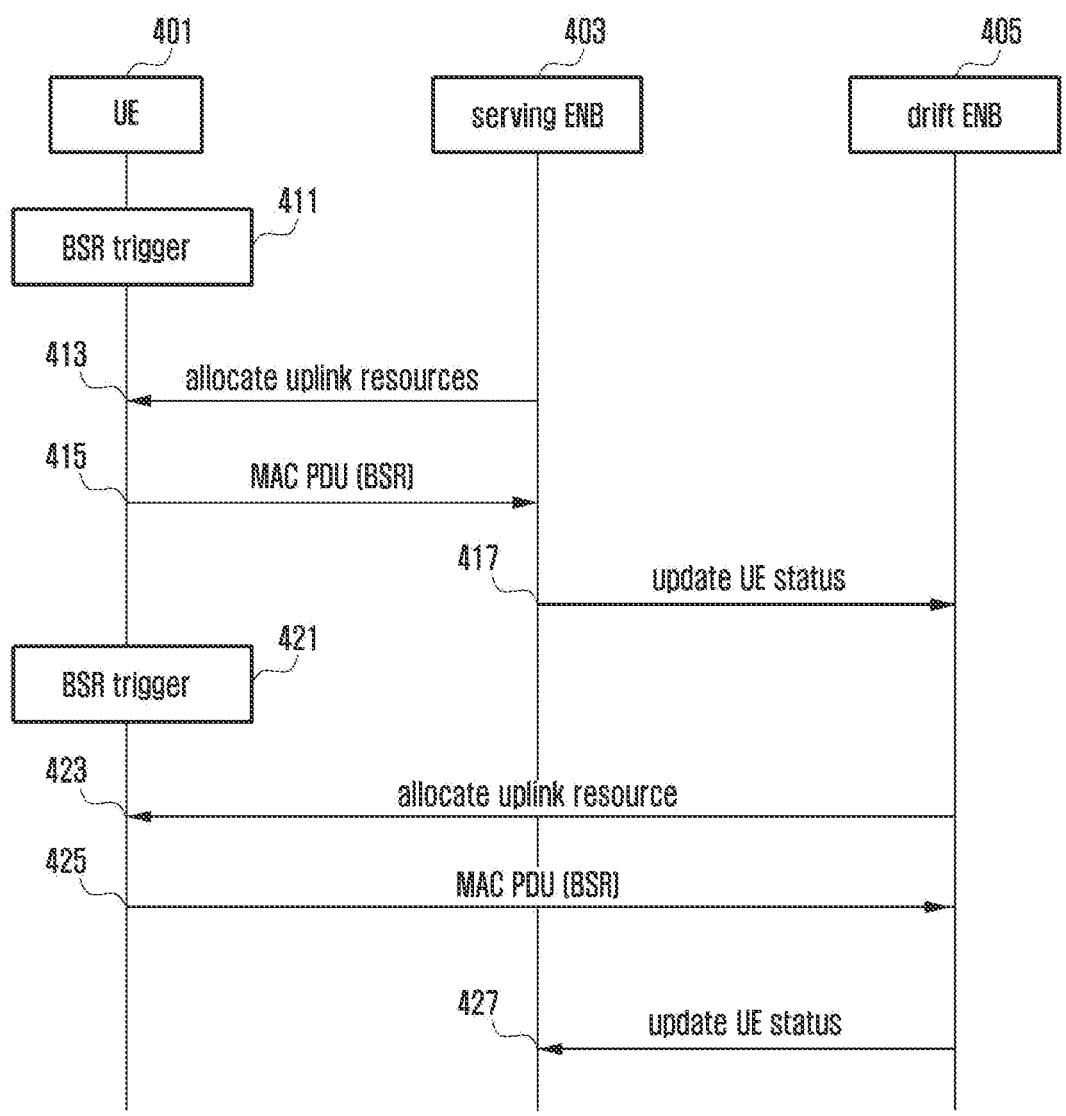
FIG. 4 illustrates a signal flow chart that describes a message flow in a method for reporting a buffer status according to a first embodiment of the present invention.

FIG. 4 illustrates a signal flow chart that describes a message flow in a method for reporting a buffer status according to a first embodiment of the present invention.

It is assumed that UE 401 aggregates one or more cells of a serving ENB 403 and one or more cells of a drift ENB 405. UE 401 is triggered to report the buffer status when it has data to be transmitted or when a periodic timer for reporting a buffer status has expired (411).

Details regarding the BSR to be triggered are as follows:
1) Type 1: Regular BSR
   It is transmitted when UE has data transmissible via a logical channel of Logical Channel Group (LCG) or a retxBSR-Timer has expired.
   It is transmitted when data to be transmitted from RLC or PDCP layer for a logical channel of the LCG is created and the data has a higher priority than a logical channel of any other LCG.
   It is transmitted when data to be transmitted from RLC or PDCP layer for a logical channel of the LCG is created and there is no data except for the data in any other LCG.
2) Type 2: Periodic BSR
   It is transmitted when the periodicBSR-Timer has expired.
3) Type 3: Padding BSR
   It is transmitted when uplink resources are allocated and the size of padding bits filling the empty space created by transmission of data is greater than or equal to the summation of the size of BSR MAC control elements and the size of the header of the BSR MAC control elements.

When UE 401 is allocated with uplink resources from the serving ENB 403 (413), it transmits the triggered BSR to the serving ENB 403 (415). The triggered BSR is the same BSR of the conventional LTE system and includes the amount of packets stacked in buffers according to LCGs. Therefore ENB sets an amount of uplink resources to be allocated to the UE and makes a schedule. An LTE system classifies packets by logical channel identifiers according to the characteristics of traffic and transmits them. When reporting a buffer status, the LTE system groups logic channels classified by the logical channel identifiers and reports buffer statuses according to the groups.

After receiving the BSR, the serving ENB 403 transmits, when UE 403 is simultaneously communicating with other ENB (the drift ENB 405 in an embodiment of the present invention), the received information to other ENB (the drift ENB 405 in an embodiment of the present invention) (417). According to reception times of the BSR, the information regarding the received BSR may not be effective. Therefore, the information regarding the received BSR may further include timestamp as information regarding a reception time point of BSR. In addition, the serving ENB 403 may further transmit a data transmission rate and an amount of resources, which will be allocated to the UE 401, while receiving the BSR.

Likewise, UE 401 is triggered to report a buffer status to the drift ENB 405 when it has data to be transmitted or a periodic timer for reporting a buffer status has expired (421). When UE 401 is allocated with uplink resources from the drift ENB 405 (423), it transmits the BSR to the drift ENB 405 (425). After receiving the BSR, the drift ENB 405 transmits it to other ENB (the serving ENB 403 in an embodiment of the present invention). In addition, the drift ENB 405 may further transmit Timestamp and a data transmission rate and an amount of resources, which will be allocated to the UE 401.

Figure 5:
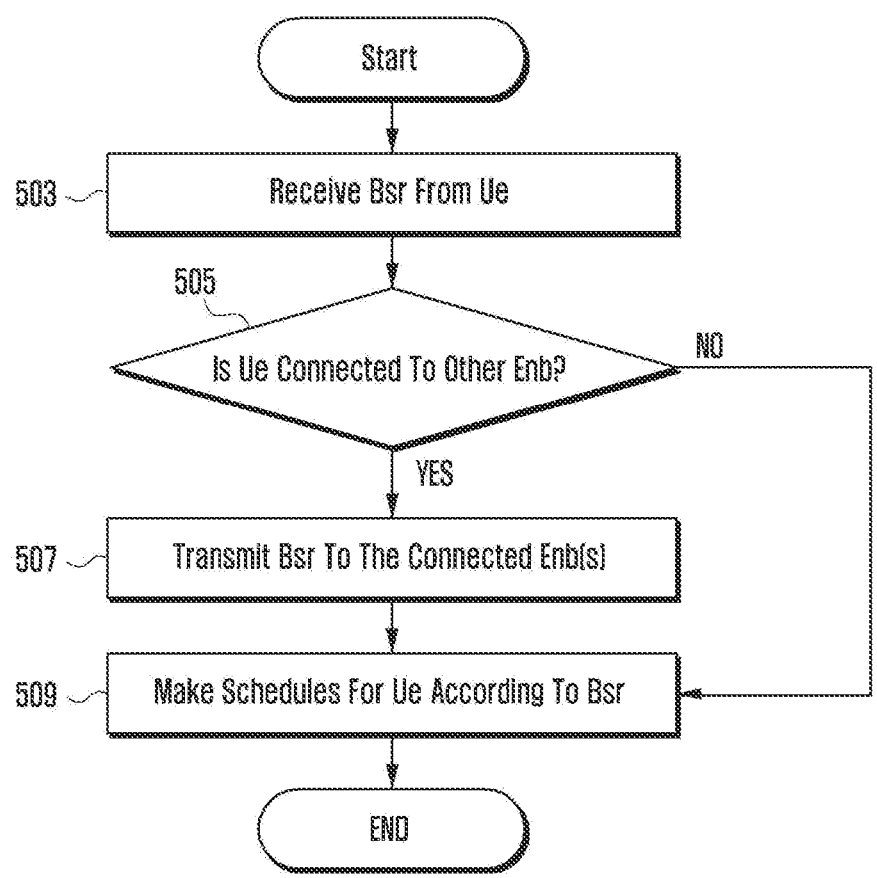
FIG. 5 illustrates a flow chart that describes a method for receiving a buffer status report (SBR) in an ENB according to a first embodiment of the present invention.

FIG. 5 illustrates a flow chart that describes a method for receiving a buffer status report (SBR) in an ENB according to a first embodiment of the present invention.

ENB receives a BSR from UE (503). ENB determines whether the UE is connected to other ENB (or ENBs) for carrier aggregation (505). When ENB ascertains that the UE is connected to another ENB (or ENBs) for carrier aggregation at operation 505, it transmits the BSR to another ENB (or ENBs) (507). The ENB may also transmit Timestamp and a data transmission rate and the amount of resources that will be allocated to the UE to the other ENB (or ENBs).

After that, the ENB allocates resources to the UE based on the BSR (509). When the ENB transmits a data transmission rate and the amount of resources that will be allocated to the UE to the other ENB (or ENBs) at operation 507, it allocates resources to the UE based on the transmitted information.

On the contrary, when ENB ascertains that the UE isn't connected to another ENB (or ENBs) for carrier aggregation at operation 505, it allocates resources to the UE based on the BSR at operation 509.

Figure 6:
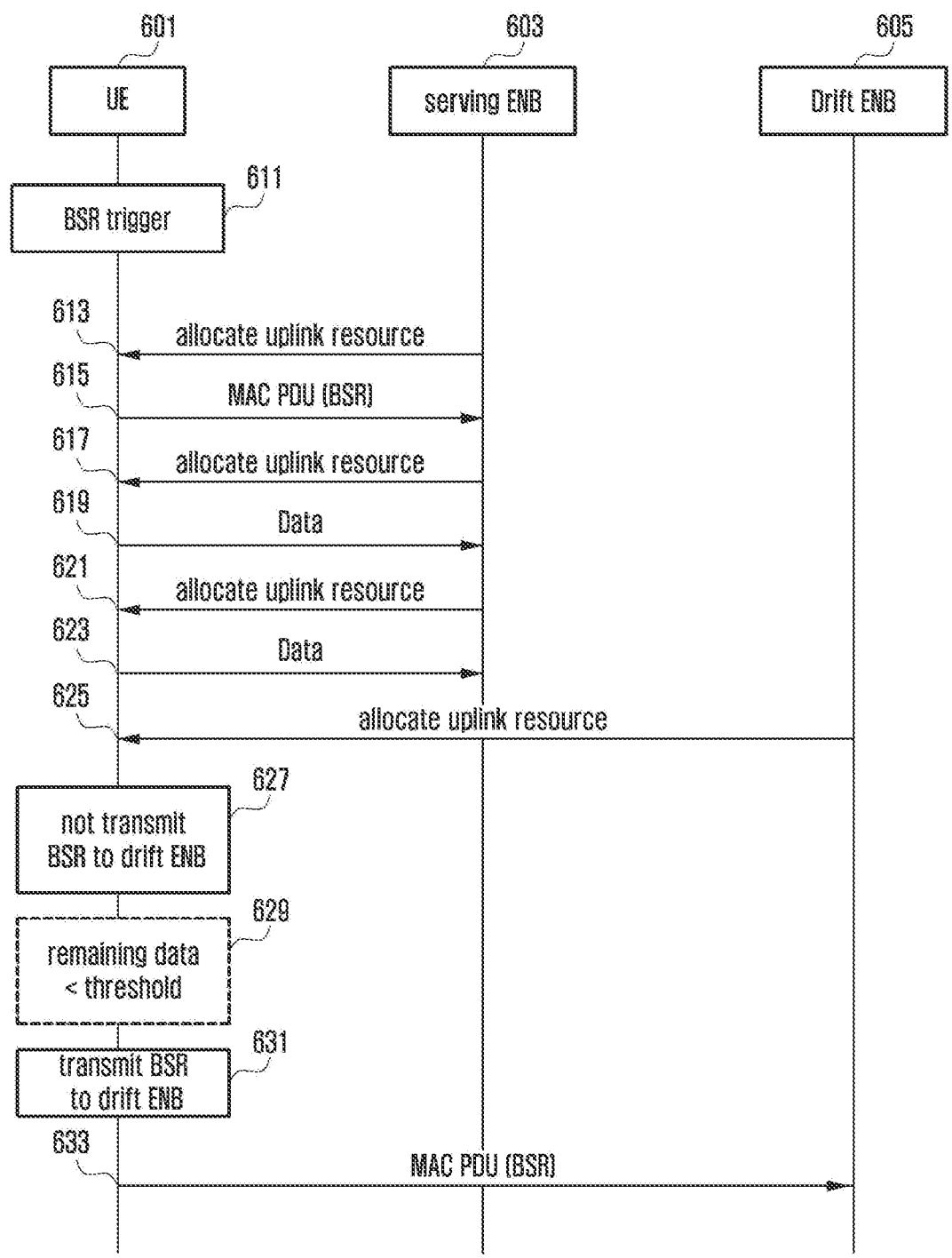
FIG. 6 illustrates a signal flow chart that describes a message flow in a method for reporting a buffer status according to a second embodiment of the present invention.

FIG. 6 illustrates a signal flow chart that describes a message flow in a method for reporting a buffer status according to a second embodiment of the present invention.

It is assumed that UE 601 aggregates one or more cells of a serving ENB 603 and one or more cells of a drift ENB 605. UE 601 is triggered to report the buffer status when it has data to be transmitted or when a periodic timer for reporting a buffer status has expired (611).

When UE 601 is allocated with uplink resources from the serving ENB 603 (613), it transmits the triggered BSR to the serving ENB 603 (615). After that, UE 601 is allocated with uplink resources from the serving ENB 603 (617 and 621), it transmits corresponding uplink data via the allocated resources to the serving ENB 603, respectively (619 and 623).

After that, when UE 601 is allocated with an uplink resource from another ENB (e.g., a drift ENB 605 in an embodiment of the present invention) (625), it concludes that the last BSR was not transmitted to the drift ENB 605 (627). After that, when UE 601 is triggered to make a transmission of a regular or periodic BSR (631), it transmits the BSR to the drift ENB 605 (633).

In that case, a problem as described in the embodiment of FIG. 4 may occur. That is, the BSR reported at operation 615 and the BSR reported at operation 633 are duplicated, so a larger amount of information regarding the BSR may be reported than the real amount. To resolve the problem, when UE 601 is allocated with uplink resources from other ENB 605 at operation 625, it concludes that the last BSR was not transmitted to the ENB 605 at operation 627 and determines whether the amount of data stacked in the buffer whose status is reported at operation 615 is less than or equal to a threshold value (629). Only if the amount of data stacked in the buffer whose status was reported at operation 615 is less than or equal to a threshold value at operation 629 and a trigger is made to transmit a regular or periodic BSR at operation 631, UE 601 transmit the BSR to the drift ENB 605 at operation 633.

The threshold value may be set to a dynamic value by using a message of Radio Resource Control (RRC) layer or to a fixed value set by the standard or according to the implementation.

Figure 7:
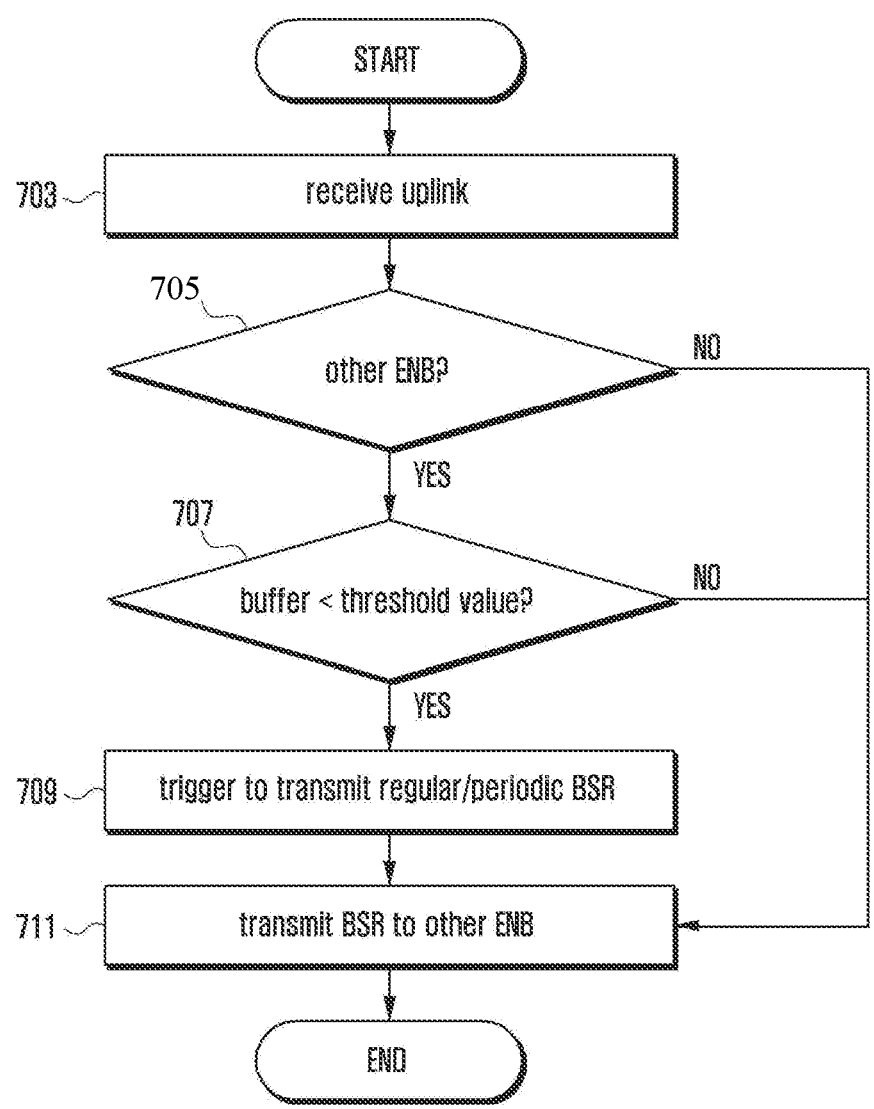
FIG. 7 illustrates a flow chart that describes a method for reporting a buffer status in UE according to a second embodiment of the present invention.

FIG. 7 illustrates a flow chart that describes a method for reporting a buffer status in UE according to a second embodiment of the present invention. That is, FIG. 7 is a flow chart that describes in detail operations 625 to 633 shown in FIG. 6.

UE is allocated with an uplink resource from an ENB (703). UE determines whether the ENB allocating the uplink resource is the ENB to which it transmitted the last BSR, i.e., the uplink resource is allocated by another ENB to which it didn't transmit the last BSR (705). When UE ascertains that the uplink resource is allocated by another ENB at operation 705, it determines whether the amount of buffer is less than a threshold value (707).

When UE ascertains that the amount of buffer is less than a threshold value at operation 707, it is triggered to transmit a regular or periodic BSR (709). After that, UE transmits the triggered BSR via the uplink resource (711). Meanwhile, the method may be modified in such a way to include operation 707 as an option. To express this, the symbol of operation 707 is illustrated in the dashed line.

On the contrary, when UE ascertains that the uplink resource isn't allocated by other ENB at operation 705, it ends the BSR reporting procedure. In addition, when UE ascertains that the amount of buffer is greater than a threshold value at operation 707, it ends the BSR reporting procedure.

Figure 8:
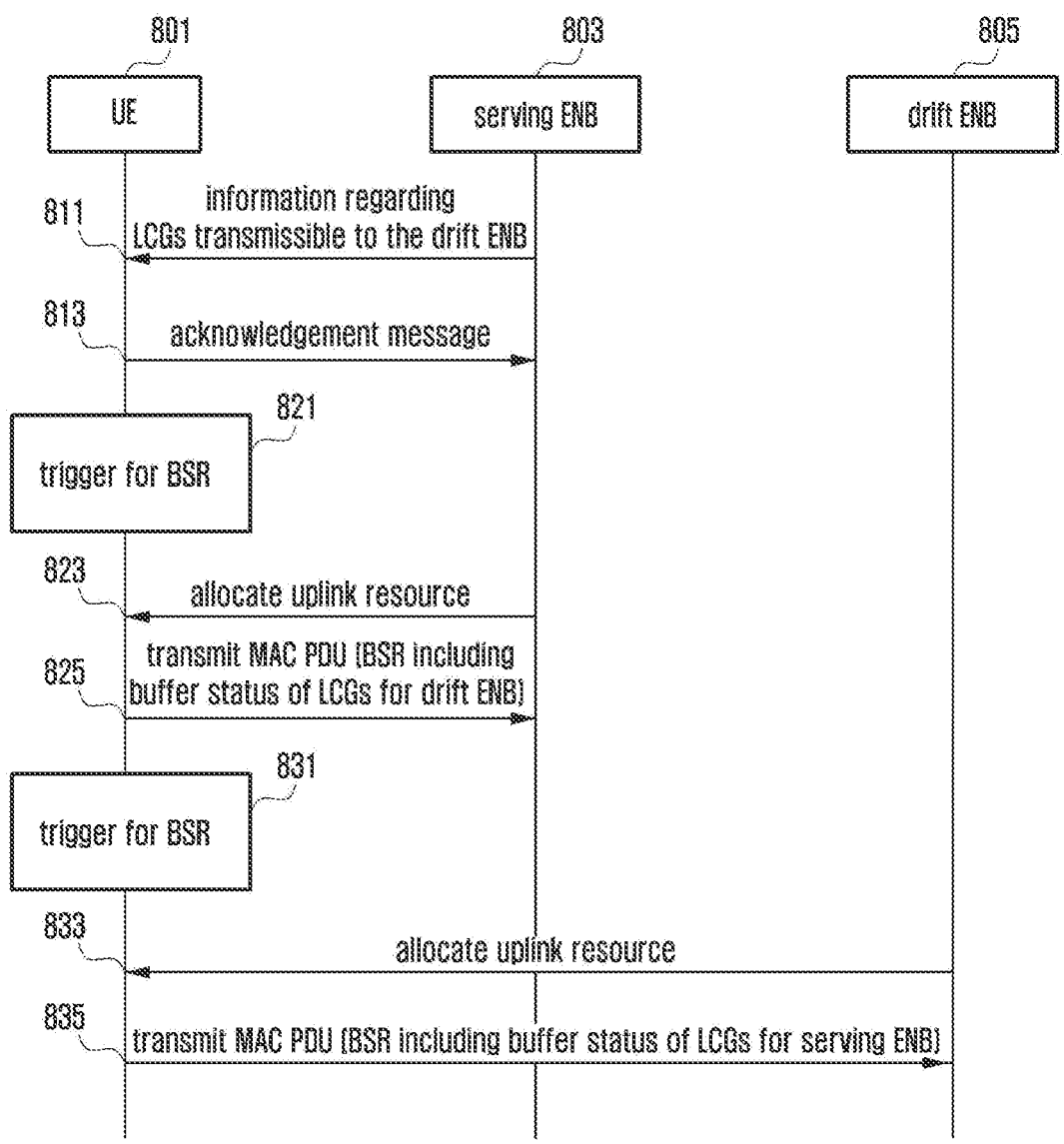
FIG. 8 illustrates a signal flow chart that describes a message flow in a method for reporting a buffer status according to a third embodiment of the present invention.

FIG. 8 illustrates a signal flow chart that describes a message flow in a method for reporting a buffer status according to a third embodiment of the present invention.

It is assumed that UE 801 aggregates one or more cells of a serving ENB 803 and one or more cells of a drift ENB 805. It is also assumed that logical channels according to ENBs (e.g., serving ENB 803 and drift ENB 805 shown in FIG. 8) differ from each other. For example, UE has five logical channels for data, Channel Nos. 3, 4, 5, 6 and 7. Channel Nos. 3, 4, and 5 form a logic channel group (LCG) LCG 1. Channel Nos. 6 and 7 form a logic channel group (LCG) LCG 2. LCG 1 is processed by the serving ENB 803 and LCG 2 is processed by the drift ENB 805.

UE 801 receives a command for associating with cells of the drift ENB 805 and information regarding LCGs transmissible to the drift ENB 805 from the serving ENB 803 (811). LCGs that UE 801 will transmit to the serving ENB 803 and drift ENB 805 according to the information regarding LCGs are determined. In an embodiment of the present invention, in order to transmit the command for associating with cells of the drift ENB 805 to the UE 801, the serving ENB 803 may use messages, such as RRCConnectionReconfiguration, etc.

When receiving the command and information at operation 811, UE 801 transmits an acknowledgement message, e.g., RRCConnectionReconfigurationComplete, etc., to the serving ENB 803 (813).

After that, UE 801 manages a set of buffers available for transmission by the serving ENB 803 and a set of buffers available for transmission by the drift ENB 805, independently.

UE 801 is triggered to transmit a regular or periodic BSR for the buffers that can perform transmission (i.e., a set of primary carriers) to the serving ENB 803 (821). When UE 801 is allocated with an uplink resource from the serving ENB 803 (823), it transmits the BSR including the buffer status of transmissible LCGs in a set of primary carriers to the serving ENB 803 (825).

In addition, UE 801 is triggered to transmit a regular or periodic BSR for the buffers that can perform transmission (i.e., a set of non-primary carriers) to the drift ENB 805 (831).

When UE 801 is allocated with an uplink resource from the drift ENB 805 (833), it transmits the BSR including the buffer status of transmissible LCGs in a set of non-primary carriers to the drift ENB 805 (835).

The BSR triggered at operation 821 or 831 may have different information according to types of BSR, i.e., regular, periodic, etc.

In particular, a regular BSR may be independently used according to sets. A periodic BSR may be independently or unitedly used according to sets.

For example, if a periodic BSR is independently used, a retxBSR-Timer and a periodicBSR-Timer may be separately configured according to sets, which means that BSR transmitted via the periodic BSR includes only the BSR of the corresponding LCG. If a periodic BSR is unitedly used, a retxBSR-Timer and a periodicBSR-Timer are operated by only one value. In addition, the periodic BSR can be transmitted to any cell and can include values of any LCGs.

Figure 9:
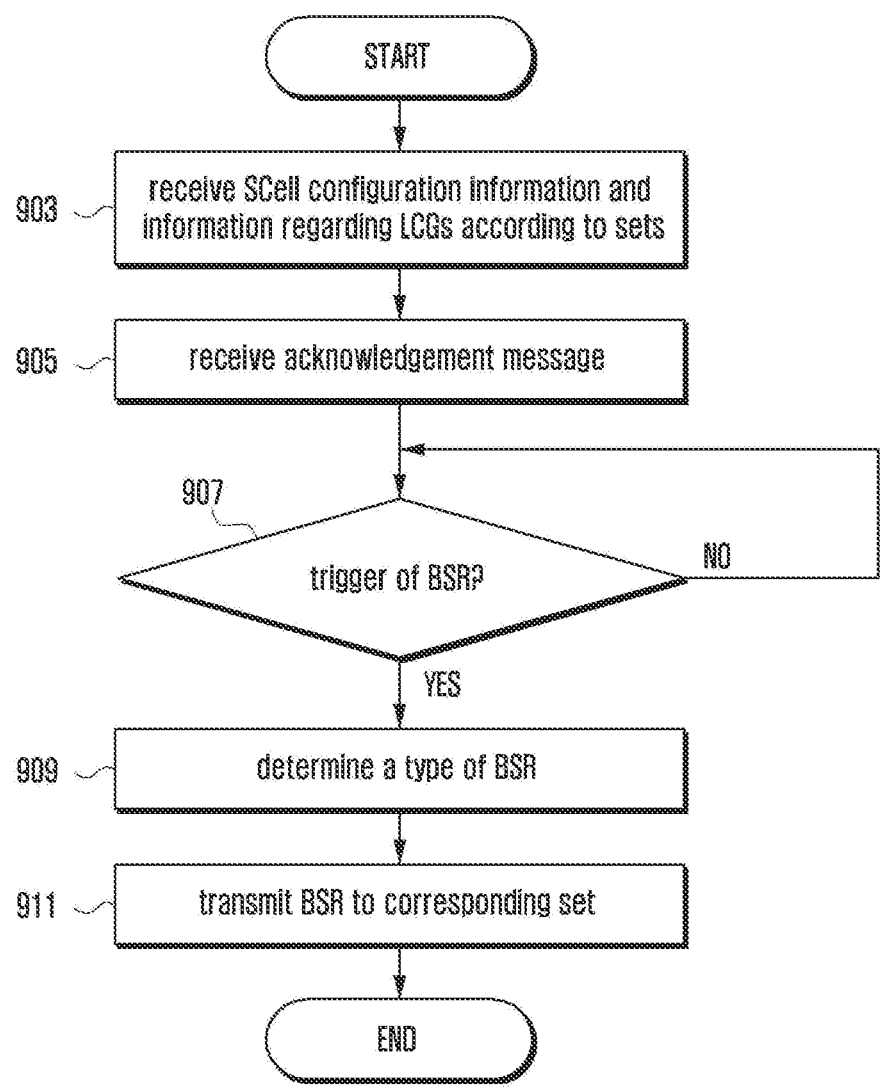
FIG. 9 illustrates a flow chart that describes a method for reporting a buffer status in UE according to a third embodiment of the present invention.

FIG. 9 illustrates a flow chart that describes a method for reporting a buffer status in UE according to a third embodiment of the present invention.

UE receives a configuration message for associating with cells of a serving ENB or drift ENB from an ENB (903). The message also includes information regarding LCGs transmissible according to ENBs. An example of the message is RRCConnectionReconfiguration.

When receiving the configuration message at operation 903, UE transmits an acknowledgement message, e.g., RRCConnectionReconfigurationComplete, etc., to the ENB (905). After that, UE determines whether BSR is triggered (907). When UE ascertains that a regular or a periodic BSR is triggered at operation 907, it determines to which LCG the triggered BSR corresponds (909). UE creates a BSR of the corresponding LCG and transmits it to the ENB that can perform transmission (911).

Figure 10:
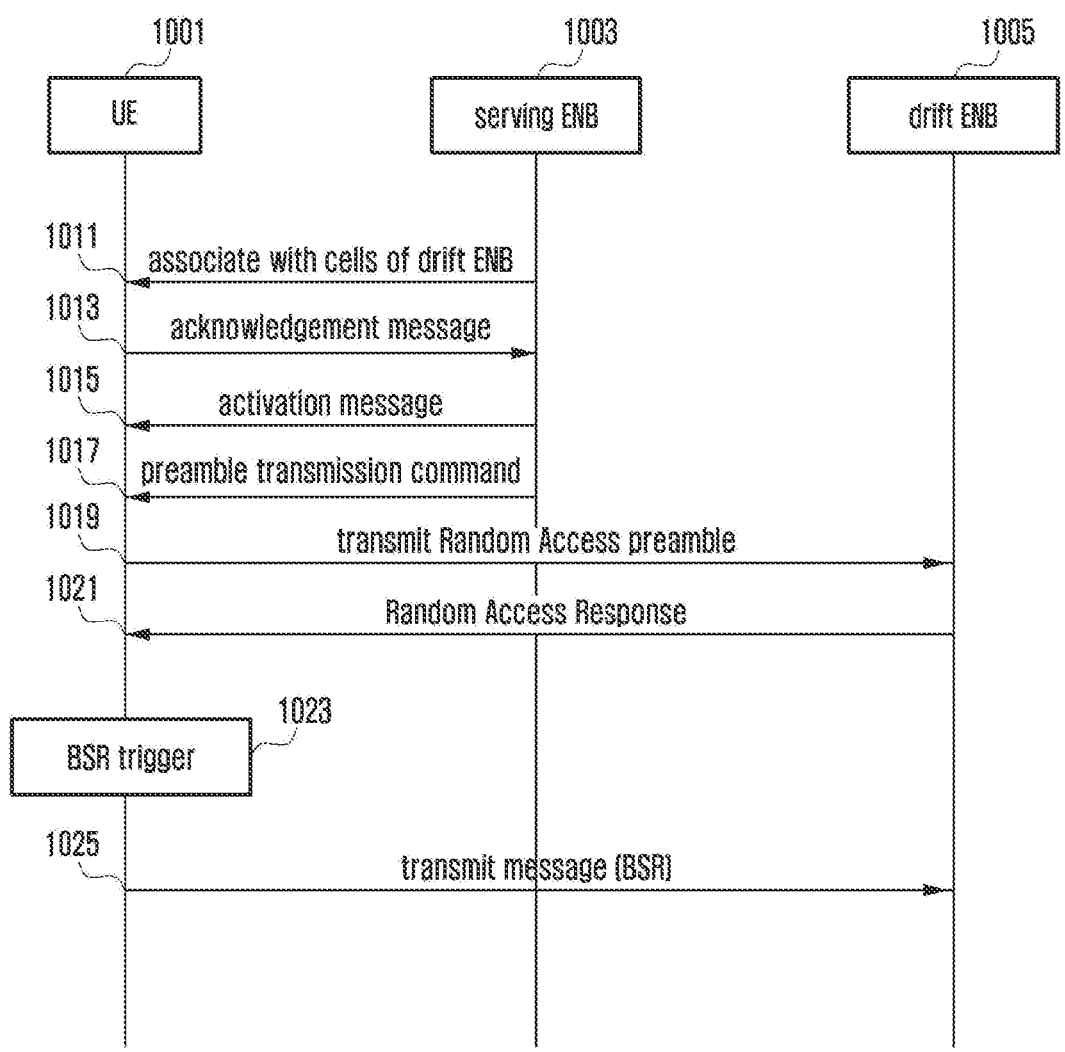
FIG. 10 illustrates a signal flow chart that describes a message flow in a method for reporting a buffer status according to a fourth embodiment of the present invention.

FIG. 10 illustrates a signal flow chart that describes a message flow in a method for reporting a buffer status according to a fourth embodiment of the present invention.

UE 1001 receives a command for associating with cells of the drift ENB 1005 from the serving ENB 1003 (1011). After receiving the command, UE 1001 transmits the acknowledgement message to the serving ENB 1003 (1013).

In order to activate the associated cells of the drift ENB 1005 at 1011, UE 1001 receives an activation message from the serving ENB 1003 (1015). In order to align uplink timings of the associated cells, UE 1001 receives a command message for transmitting preambles to the cells from the serving ENB 1003 (1017).

UE 1001 transmits a corresponding Random Access preamble to the drift ENB 1005 (1019), and receives the Random Access Response (RAR) message from the drift ENB 1005 (1021). The RAR message includes Timing Advance information regarding uplink timing alignment and information regarding additionally allocated uplink resources. UE 1001 triggers the BSR according to the allocated uplink resources (1023). UE 1001 transmits the BSR via the resources (1025).

Figure 11:
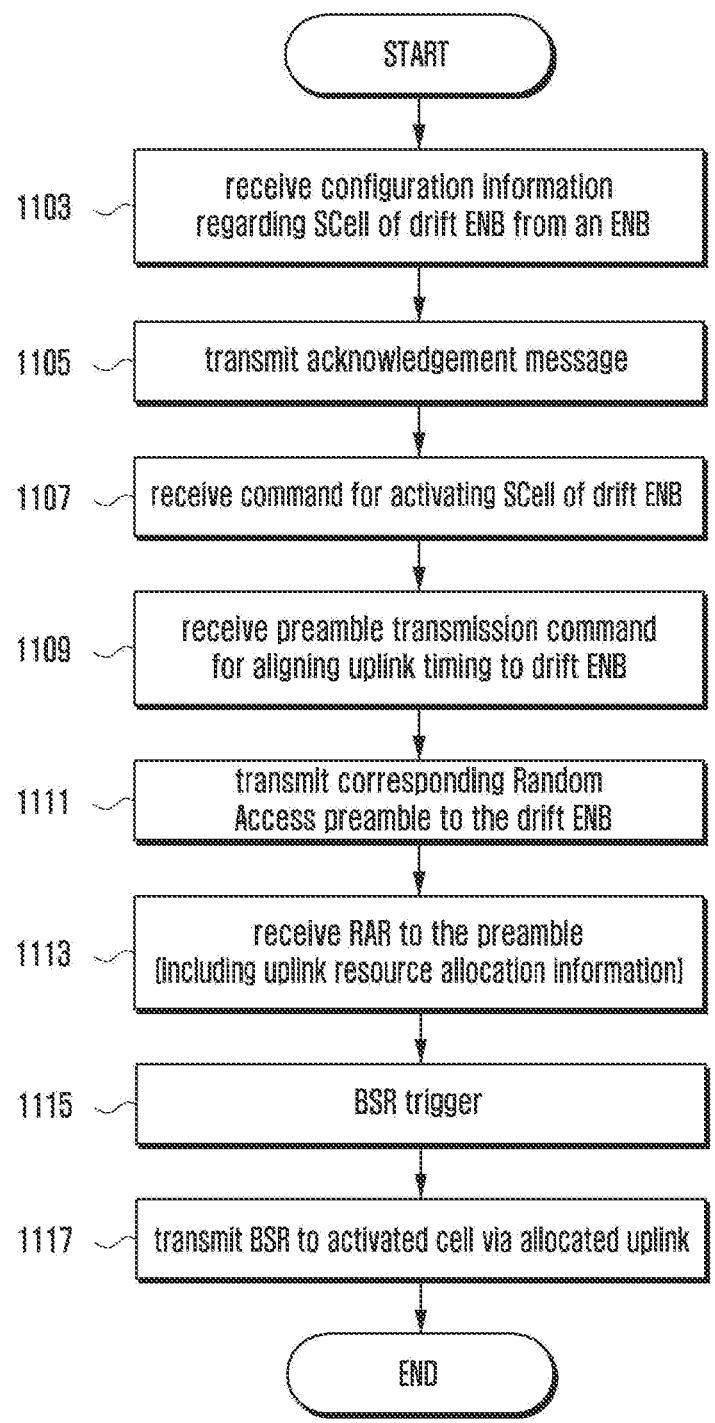
FIG. 11 illustrates a flow chart that describes a method for reporting a buffer status in UE according to a fourth embodiment of the present invention.

FIG. 11 illustrates a flow chart that describes a method for reporting a buffer status in UE according to a fourth embodiment of the present invention.

UE receives a command for associating with cells of the drift ENB from an ENB (1103). After receiving the command, UE transmits the acknowledgement message to the ENB (1105).

In order to activate the associated cells of the drift ENB, UE receives an activation message (1107). In order to align uplink timings of the associated cells, UE receives a command message for transmitting preambles to the cells (1109).

UE transmits a corresponding Random Access preamble to the drift ENB according to the command (1111) and receives the Random Access Response (RAR) message from the drift ENB (1113). The RAR message includes Timing Advance information regarding uplink timing alignment and information regarding additionally allocated uplink resources.

UE triggers the BSR according to the allocated uplink resources (1115). UE transmits the BSR via the resources (1117).

Figure 12:
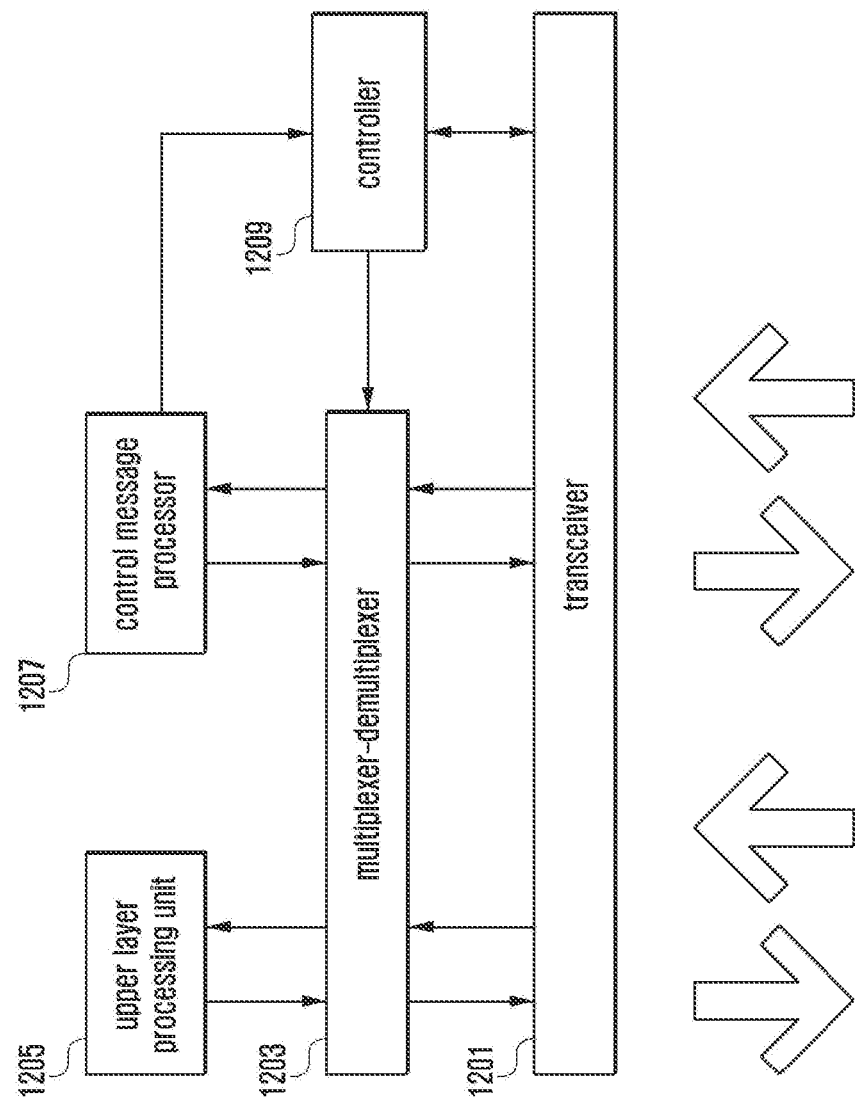
FIG. 12 illustrates a schematic block diagram of user equipment (UE) according to an embodiment of the invention.

FIG. 12 illustrates a schematic block diagram of user equipment (UE) according to an embodiment of the invention.

UE transmits/receives, to/from the other systems, data via the upper layer processing unit 1205 and control messages via the control message processor 1207. In transmission, the controller 1209 controls the multiplexer-demultiplexer 1203 to multiplex data and the transceiver 1201 to transmit the multiplexed data. In reception, the controller 1209 controls the transceiver 1201 to receive physical symbols and the multiplexer-demultiplexer 1203 to de-multiplex the symbols, and transfers the de-multiplexed data to the upper layer unit 1205 or the control message processor 1207 according to the control message.

Figure 13:
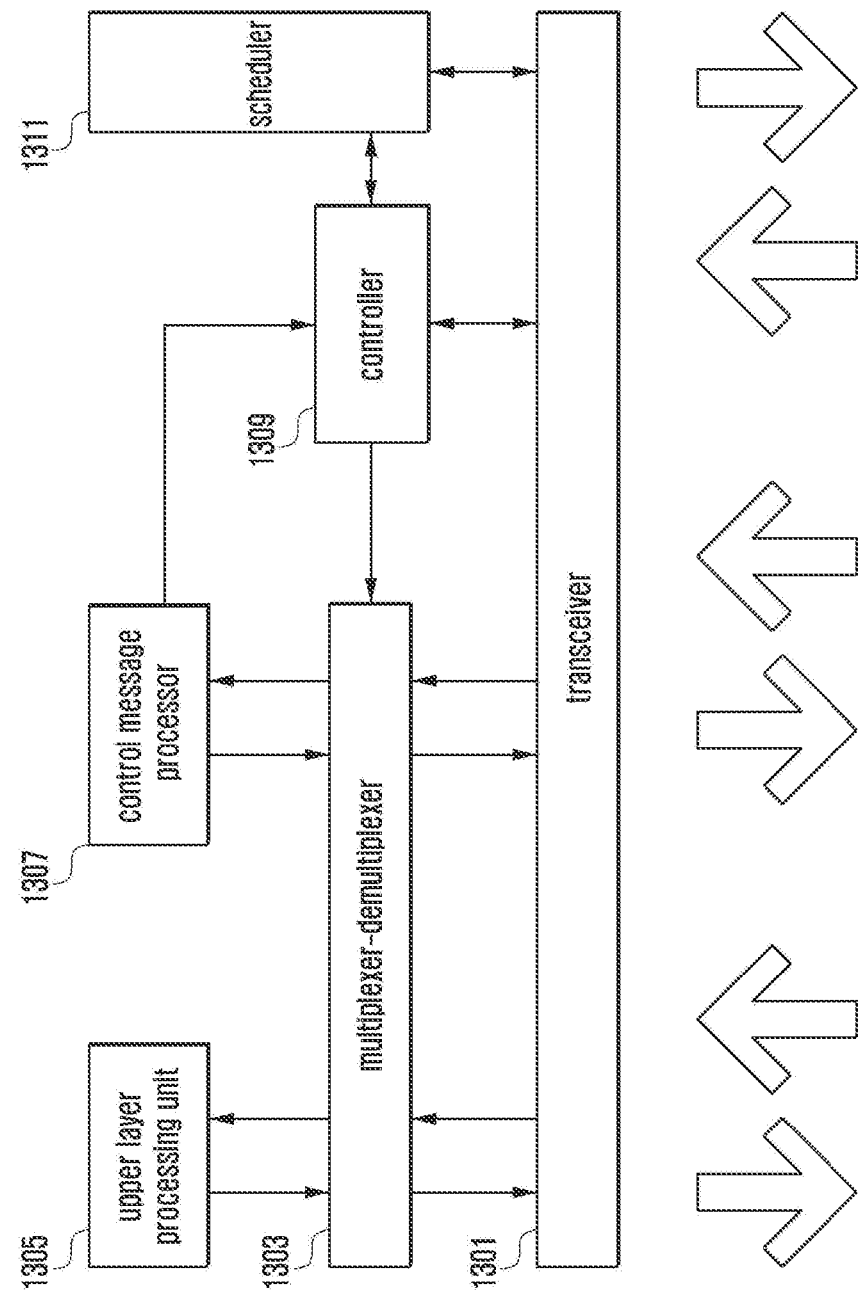
FIG. 13 illustrates a schematic block diagram of an ENB according to an embodiment of the invention.

FIG. 13 illustrates a schematic block diagram of an ENB according to an embodiment of the invention.

The ENB includes a transceiver 1301, a controller 1309, a multiplexer-demultiplexer 1303, a control message processor 1307, an upper layer processing unit 1305, and a scheduler 1311.

The transceiver 1301 transmits data and control signals via a forward carrier and also receives data and control signals via a reverse carrier. If multi-carriers are configured, the transceiver 1301 receives/transmits data and controls signals via the multi-carriers.

The multiplexer-demultiplexer 1303 multiplexes data from the upper layer processing unit 1305 or the control message processor 1307. The multiplexer-demultiplexer 1303 also de-multiplexes data received via the transceiver 1301 and transfers it to the upper layer processing unit 1305, the control message processor 1307, or the controller 1309.

The control message processor 1307 processes control messages transmitted from UE and performs corresponding operations. The control message processing unit 1307 also creates control messages to be transmitted to UE and transfers them to the lower layers.

The upper layer processing unit 1305 can be configured according to UE devices and services. The upper layer processing unit 1305 processes data, created by user services such as FTP, VoIP, etc., and transfers them to the multiplexer-demultiplexer 1303. The upper layer processing unit 1305 processes data from the multiplexer-demultiplexer 1303 and transmits them to service applications in the upper layer.

The controller 1309 detects a time of CSI/SRS transmission by UE and controls the transceiver 1301.

The scheduler 1311 assigns transmission resources to UE at a time point according to buffer status of UE, channel state, active time of UE, etc. The scheduler 1311 allows the transceiver 1301 to process signals transmitted from UE or to transmit signals to UE.

According to the embodiments of the present invention, when aggregating inter-ENB carriers, UE can transmit corresponding uplink data values to ENBs and be evenly allocated with uplink resources from the ENBs.

Although exemplary embodiments of the invention have been described in detail above, it should be understood that many variations and modifications of the basic inventive concept herein described, which may be apparent to those skilled in the art, will still fall within the spirit and scope of the exemplary embodiments of the invention as defined in the appended claims.

The invention claimed is:

1. A method performed by a user equipment (UE) in a wireless communication system, the method comprising:
   receiving, from a first base station, first radio resource control (RRC) information on a first logical channel group (LCG), wherein the first LCG is associated with a first cell group;
   receiving, from the first base station, second RRC information on a second LCG, wherein the second LCG is associated with a second cell group;
   in case that at least one of logical channels contains uplink data, identifying whether a buffer status report (BSR) is triggered based on an expiration of a timer associated with the BSR, wherein the at least one of the logical channels belongs to the first LCG or the second LCG, and wherein a type of the BSR is a regular BSR; and
   in case that the BSR is triggered, transmitting the BSR to the first cell group or the second cell group.

2. The method of claim 1, wherein transmitting the BSR further comprises:
   transmitting the BSR to the first cell group in case that the at least one of the logical channels belongs to the first LCG; and
   transmitting the BSR to the second cell group in case that the at least one of the logical channels belongs to the second LCG.

3. The method of claim 1, wherein transmitting the BSR further comprises:
   receiving information for allocating resources for uplink transmission; and
   transmitting the BSR using the resources.

4. A method performed by a first base station in a wireless communication system, the method comprising:
   transmitting, to a user equipment (UE), first radio resource control (RRC) information on a first logical channel group (LCG), wherein the first LCG is associated with a first cell group; and
   transmitting, to the UE, second RRC information on a second LCG, wherein the second LCG is associated with a second cell group, wherein, in case that a buffer status report (BSR) is triggered, the BSR is transmitted to the first cell group or the second cell group, wherein the BSR is triggered, in case that at least one of logical channels contains uplink data, based on an expiration of a timer associated with the BSR, wherein the at least one of the logical channels belongs to the first LCG or the second LCG, and wherein a type of the BSR is a regular BSR.

5. The method of claim 4, further comprising:

receiving the BSR, in case that the at least one of the logical channels belongs to the first LCG.

6. The method of claim 4, wherein receiving the BSR further comprises:

transmitting information for allocating resources for uplink transmission; and receiving the BSR using the resources.

7. A user equipment (UE) in a wireless communication system, the UE comprising:

a transceiver; and a controller configured to:

receive, from a first base station, first radio resource control (RRC) information on a first logical channel group (LCG), wherein the first LCG is associated with a first cell group, receive, from the first base station, second RRC information on a second LCG, wherein the second LCG is associated with a second cell group, in case that at least one of logical channels contains uplink data, identify whether a buffer status report (BSR) is triggered based on an expiration of a timer associated with the BSR, wherein the at least one of the logical channels belongs to the first LCG or the second LCG, and wherein a type of the BSR is a regular BSR, and in case that the BSR is triggered, transmit the BSR to the first cell group or the second cell group.

8. The UE of claim 7, wherein the controller is configured to:

transmit the BSR to the first cell group in case that the at least one of the logical channels belongs to the first LCG, and transmit the BSR to the second cell group in case that the at least one of the logical channels belongs to the second LCG.

9. The UE of claim 8, wherein the controller is further configured to:

receive information for allocating resources for uplink transmission, and transmit the BSR using the resources.

10. A first base station in a wireless communication system, the first base station comprising:

a transceiver; and a controller configured to:

transmit, to a user equipment (UE), first radio resource control (RRC) information on a first logical channel group (LCG), wherein the first LCG is associated with a first cell group, and transmit, to the UE, second RRC information on a second LCG, wherein the second LCG is associated with a second cell group, wherein, in case that a buffer status report (BSR) is triggered, the BSR is transmitted to the first cell group or the second cell group, wherein the BSR is triggered, in case that at least one of logical channels contains uplink data, based on an expiration of a timer associated with the BSR, wherein the at least one of the logical channels belongs to the first LCG or the second LCG, and wherein a type of the BSR is a regular BSR.

11. The first base station of claim 10, wherein the controller is configured to receive the BSR, in case that the at least one of the logical channels belongs to the first LCG.

12. The first base station of claim 10, wherein the controller is configured to:

transmit information for allocating resources for uplink transmission, and receive the BSR using the resources.

* * * * *